United States Patent
Shi

(10) Patent No.: US 8,434,140 B2
(45) Date of Patent: Apr. 30, 2013

(54) PORT HOPPING AND SEEK YOU PEER TO PEER TRAFFIC CONTROL METHOD AND SYSTEM

(75) Inventor: Fleming Shi, Cupertino, CA (US)

(73) Assignee: Barracuda Networks, Inc., Campbell, CA (US)

( * ) Notice: Subject to any disclaimer, the term of this patent is extended or adjusted under 35 U.S.C. 154(b) by 171 days.

(21) Appl. No.: 12/907,573

(22) Filed: Oct. 19, 2010

(65) Prior Publication Data

US 2011/0035795 A1 Feb. 10, 2011

Related U.S. Application Data

(63) Continuation-in-part of application No. 11/935,952, filed on Nov. 6, 2007, now abandoned.

(51) Int. Cl.
*G06F 21/00* (2006.01)
(52) U.S. Cl.
USPC .......................................................... 726/13
(58) Field of Classification Search ............ 726/13, 726/11; 709/223–225; 707/754
See application file for complete search history.

(56) References Cited

U.S. PATENT DOCUMENTS

| | | | |
|---|---|---|---|
| 2006/0167915 A1* | 7/2006 | Furlong et al. ................. | 707/101 |
| 2006/0168318 A1* | 7/2006 | Twiss ............................ | 709/238 |
| 2007/0002769 A1* | 1/2007 | Matityahu et al. ............. | 370/255 |
| 2007/0094730 A1* | 4/2007 | Bhikkaji et al. ................ | 726/24 |
| 2007/0166051 A1* | 7/2007 | Sebayashi et al. ............. | 398/177 |

* cited by examiner

*Primary Examiner* — Brandon Hoffman
*Assistant Examiner* — Anthony Brown
(74) *Attorney, Agent, or Firm* — Patentry

(57) ABSTRACT

A network apparatus, system, and method for operating a server to identify and subsequently control suspected peer-to-peer (P2P) sources transmitting traffic from a first network to a second network. Identifying a peer-to-peer source by a characteristic of destination port profile. Identifying a peer-to-peer source by a characteristic of destination host IP address profile. Determining when hopping ports usage comprise a data stream. Determining when destination IP address usage represent "Seek You" (CQ) like call behavior analogous to a radio invitation for any operators listening to respond.

11 Claims, 6 Drawing Sheets

PORT HOPPING AND SEEK YOU PEER TO PEER TRAFFIC CONTROL METHOD AND SYSTEM

CROSS-REFERENCE TO RELATED APPLICATIONS

This application is a CIP of non-provisional utility patent application Ser. No. 11/935,952 filed Nov. 6, 2007 by the present inventor, PEER-TO-PEER TRAFFIC CONTROL METHOD AND SYSTEM, which is incorporated by reference.

BACKGROUND

1. Field of Invention

The present invention relates to a network firewall apparatus that detects peer-to-peer (P2P) application network traffic from a source host on a network to destination hosts external to the computer network.

2. Discussion of Conventional Known Methods

According to Sydnor, Knight, and Hollaar "A Report to the USPTO from the Office of International Relations" p 47 Conclusions:

Government and Corporate IT-Security Managers: For anyone concerned about protecting the security of sensitive data or the security of computer networks, questions about whether features that can cause users to share files unintentionally were intended to do so are largely irrelevant. In either case—and as DHS has acknowledged—filesharing programs present a tripartite threat to the security of data and networks.

Filesharing programs can cause inadvertent sharing that can compromise entire networks: In networked environments, the effects of the "features" discussed above can be particularly devastating. For example, on some networks, a user who tries to store downloaded files in a folder like "Documents and Settings" can end up "sharing" all files created by all users of the network. Even home use of Filesharing programs can compromise government or corporate networks: Usability and Privacy notes that if a home computer has a VPN connection to a corporate or governmental network, a user can inadvertently "share" the portion of the network available through the VPN connection.

Filesharing programs can infect computers or networks with malicious code: To avoid vicarious liability for pervasive infringing uses of their programs, distributors of file sharing programs stopped registering or uniquely identifying individual users of their programs. Distributors knew that this would encourage distributors of malicious code to use popular downloads as a means to compromise computers and networks: "As you would expect, when files often come from anonymous and uncertified sources, the risk of that file containing a virus greatly increases." As a result, research by the security company TruSecure found that 45% of popular downloaded files concealed malicious code.

Filesharing programs can contain vulnerabilities that hackers can exploit to steal sensitive data: DHS warns that Filesharing programs "can result in network intrusions and the theft of sensitive data . . . . [F]ederal government organizations have discovered the presence of P2P software on compromised systems while investigating cyber intrusions." McGill University warns that some Filesharing programs are developed by "ragtag teams following ad hoc plans, resulting in barely functional, extremely buggy clients that are prone to security breaches."[79]

All three of these risks increase because Filesharing programs—unlike most others—often appear to be designed to go where they are not wanted and to evade the security measures that could exclude them." . . . "There will almost never be a legitimate business or governmental justification for employee use of Filesharing programs. Nevertheless, preventing employees from using these programs on corporate or government networks can be both difficult and expensive."

Peer-to-peer (P2P) applications are frequently considered unwelcome guests in a network because they consume bandwidth. Network administrators have an obligation to protect and manage their resources as well as to avoid liability for piracy or other damage to intellectual property rights such as copyright. In addition to security concerns, peer-to-peer applications have the potential to degrade quality of service for all users in a network. As noted above, unsophisticated users of peer-to-peer applications may be manipulated into inadvertently exposing personal or confidential information.

Conventional firewalls are used to prevent network intrusion and the inward movement of malware. They are poorly architected to control the proliferation of peer-to-peer applications. Conventional firewalls may be used to block selected ports. They may also be used to block specific IP addresses or ranges of addresses. In practice they also depend on the receipt of black lists of IP addresses or ports to identify a server having an application which is objectionable.

It is a characteristic of Peer-to-Peer (P2P) applications that they are designed to circumvent fixed barriers such as firewalls. There are no limit to the number of hosts employed for peer-to-peer applications so a list of IP addresses would be ineffective. And ports may be pseudo-randomly selected from a large number so blocking a specific port would not prevent a peer-to-peer application. And peer-to-peer applications quickly proliferate among many hosts which would make compiling a list of IP addresses futile.

Stacy 20050213570 discloses a method for filtering malicious data packets in Denial of Service attacks. In paragraphs [0009-[0011] Stacy discloses "[0009] As used herein, a dataflow is a stream of data packets that is communicated from a source node to a destination node. . . . [0010] . . . The hash table is typically organized as a table of linked lists, where each list may be indexed by the result of applying a conventional hash function to "signature" information. In this context, a signature is a set of values that remain constant for every packet in a data flow. For example, assume each packet in a first data flow stores the same pair of source and destination IP address values. In this case, a signature for the first data flow may be generated based on the values of these source and destination IP addresses. Likewise, a different signature may be generated for a second data flow whose packets store a different set of source and destination IP addresses than packets in the first data flow. Of course, those skilled in the art will appreciate that a data flow's signature information is not limited to IP addresses and may include other information, such as TCP port numbers, IP version numbers and so forth.

Each linked list in the hash table contains one or more entries, and each linked-list entry stores information corresponding to a particular data flow. . . . "

In paragraph [0058] Stacy discloses " . . . For example, the signature information extracted by the engine 524 may include, among other things, source or destination TCP port numbers, source or destination IP addresses, protocol identifiers and so forth." In paragraph [0059] "The extracted signature information is then input to a hash-entry address generator 530 in the flow classifier. The hash-entry address generator includes a hash-function unit 532 that applies a predetermined hash function to the received signature information, thereby generating an n-bit resultant hash value."

In paragraph [0068] Stacy discloses " . . . In operation, the linked-list walker 526 locates a linked list in the hash table 600 using the list pointer 630 contained in the hash-table entry 610 whose memory address was generated by the hash-entry address generator 530. Then, the linked-list walker sequentially traverses ("walks") the list's linked-list entries 650 until it identifies a matching entry that contains the packet's signature information 652 or until the end of the list is reached."

In paragraph [0071] Stacy discloses "At step 732, a packet-identifier engine 522 in the flow classifier identifies the type of data packet 160 received at the network interface 210. At step 736, signature information is extracted from a predetermined set of fields in the packet's descriptors and headers, based on the identified packet type. For example, the signature information may include TCP port number, IP addresses, protocol versions and so forth. At step 740, the extracted signature information is forwarded to a hash-entry address generator 530, in which a hash-function unit 532 calculates a hash of the signature information, . . . The hash of the signature information is used to create an index in the hash table 600. " Thus it can be appreciated that Stacy's linked list does not enable counting the number of destination ports utilized for a single destination Internet Protocol (IP) address since it is matching a hash which is either match or no match. Nor can Stacy's link list reveal if a peer-to-peer application source is trying to connect by sending to a large number of destination IP address. Thus it can be appreciated that what is needed is a way to determine that a Peer-to-peer application is trying to connect by transmitting to a non-repeating series of destination IP addresses or trying to evade detection by transmitting to a non-repeating series of destination ports after it has connected to a destination host.

Segel 20070133419 discloses in paragraph [0022] "The traffic flow controller may instead select a traffic congestion management function to be applied to all communication traffic of the communication traffic stream." In paragraph [0027] "Determining may involve one or more of: processing the received communication traffic to determine its type, and determining whether the received communication traffic belongs to a communication traffic stream . . . " In paragraph [0032] "The identifier of a communication traffic stream may include a source and a destination of the communication traffic stream." In paragraph [0005] Segal discloses ' . . . examining the DiffServ Code Point field in the IP header of the packet" In paragraph [0060] Segal discloses "The expression "traffic stream" as used herein may refer to a communication session between two end points . . . A stream may be identified by source and destination IP address . . . and also use . . . IP port and protocol to distinguish different type of traffic between session end points. The phase "5-tuple" (of IP source and destination address, source and destination port, and protocol) is one example of a stream identifier . . . " None of Segal's disclosures would distinguish a source sending packets to many diverse non-standard ports at a destination as a stream. Segal does not disclose measuring packets sent to diverse destination ports for a destination IP address as traffic type determination. In paragraph [0107] Segal discloses "The congestion management method 40 begins at 42 when communication traffic is received for transfer . . . At 44, a type of the received communication traffic is determined." Thus it appears that what is needed is an improved method to determine a type of communication traffic other than to examine every packet of communication traffic which is received.

Bhikkaji 20070094730 discloses in paragraph [0011] a method . . . for preventing a worm attack in a network . . . by correlating the spread of IP addresses in a worm's randomly generated IP address space, along with the worm's packet signature, and a role reversal behavior. The role reversal behavior implies that the role of a port changes from initially being a target to being a propagator of the worm attack." In paragraph [0014] A plurality of Worm Attack Identification caches . . . stores packets with a set of characteristics . . . the communication protocol, the IP address of the source, the IP address of the destination, the port address of the source, and the port address of the destination of the packet." In paragraph [0015] "a count . . . for the number of packets . . . originating from a similar source IP address and source and/or destination port within a predefined timeframe." In paragraph [0016] "compares the number of packets originating from a similar IP source address with a predefined first threshold (T1). First comparison module also compares the number of packets originating from similar IP source address with a predefined second threshold (T2)." Both thresholds are compared with the same measure: number of packets originating from a similar IP source address. In paragraphs [0022-0023] physical ports on access switches are disclosed. It is understood by those skilled in the art of Internet Protocol that the source and destination ports of IP packets are not physical ports. Bhikkaji does not disclose counting the number of destination ports utilized for each destination IP address. In paragraph [0042] Bhikkaji teaches away from addressing the problem by disclosing "the invention . . . can be tuned to determine if the role reversal is happening in a higher magnitude than is possible in a normal peer-to-peer application. This is necessitated in order to prevent any false-positives." Thus it can be appreciated that what is needed is a method to detect a peer-to-peer application which is actively avoiding detection by hopping among many source or destination ports.

Furlong 20060167915 discloses a method to scan every character of every packet's payload to find a pattern match. However it would be impractical to scan every packet passing through a gateway to discover if a peer-to-peer application was operating within a network. Furlong does not disclose a method to efficiently determine whether a source within a network is at all generating peer-to-peer network traffic nor does it examine IP headers of a packet to determine if further analysis is desirable for the packet. Thus it can be appreciated that what is needed is a method to identify that such pattern matching as Furlong is needed and to limit the number of packets that consume resources operating the Furlong method of pattern matching.

Sebayashi 20070166051 discloses in paragraph [0002] "communication traffic matches predetermined conditions for detecting suspicious attacking packets is checked at a repeater device. When matching traffic is detected, the repeater device generates a signature indicating a transmission band restriction value of the detected suspicious attacking packet, sends the signature to an adjacent repeater, . . . and thereafter performs the process of restricting the transmission band of suspicious attacking packets identified by the signature." In paragraph [0011] "a . . . unit that determines whether a number of packets that satisfy a condition of the signature received from the adjacent repeater device within a unit time exceeds a predetermined threshold . . . "Yet Sebayashi fails to disclose the method of determining whether a packet satisfies a condition of the signature received at all. It is known that a conventional network attack protection from Denial of Service or Distributed Denial of Service (DDoS) expects many sources directing packets to one or a few destination hosts. A condition of the signature for a conventional DDoS defending system would include a small number of destination hosts. Sebayashi does not disclose a condition of NOT satisfying a signature as controlling passage of a packet. Thus it can be appreciated that what is needed is a method to determine when suspected a peer-to-peer application host may be attempting to connect to any one of a very large number of destination hosts each with a unique IP address.

Thus it can be appreciated that what is needed is a more flexible system to control traffic which adapts to the specific peer-to-peer traffic found in a local area network, which identifies potential sources of peer-to-peer traffic, which efficiently identifies attempts to connect peer-to-peer applications, and which disposes efficiently with packets suspected to contain peer-to-peer content.

SUMMARY

The present invention is a system and apparatus which comprises a processor and computer readable media tangibly embodying the following method. The present invention is a method comprising reading destination ports and IP addresses on packets, matching digital fingerprint patterns on packets with those associated with peer-to-peer traffic, and disposing of packets which appear to have content, destination ports, and destination IP addresses consistent with peer-to-peer application traffic.

DRAWINGS

DETAILED DISCLOSURE OF EMBODIMENTS

Figure 1:
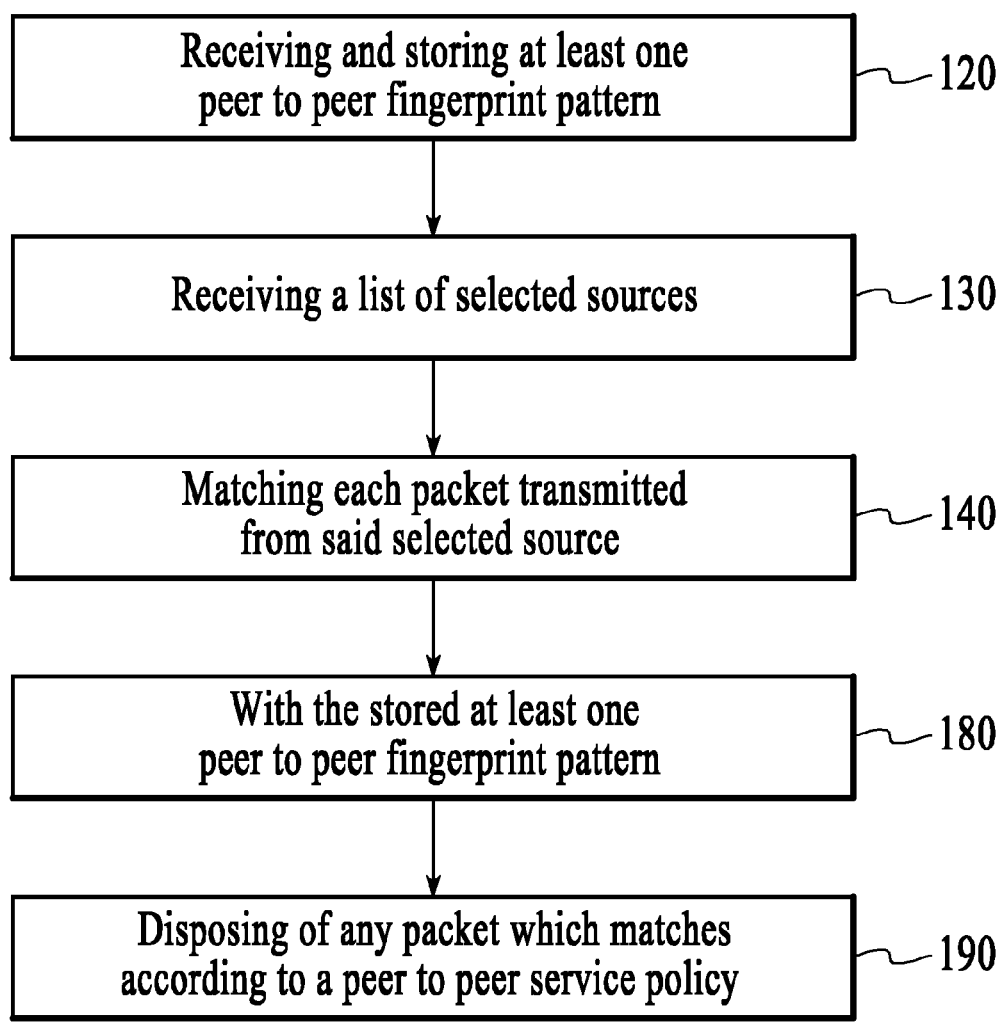
FIG. 1 is a flowchart illustrating the core method of the invention.

A firewall is a gateway between a first network and a second network which selectively filters packets, ie. prevents some traffic from successfully passing from one network to the other. To be effective, a large number of packets must be handled efficiently to avoid congestion at a gateway. The first method of the present invention is to accumulate information by reading the source and destination information of outgoing packets. Source nodes within the local area network which are sending to rapidly varying destinations are identified for further analysis. For selected IP addresses, the invention stores and compares destination ports. Some destination ports are well known for standard protocols. The nature of client server applications is that ports are stable and within a limited range. To avoid collision with these applications, peer-to-peer applications select from a higher range of ports. To avoid being blocked by a firewall, peer-to-peer applications apparently change their ports randomly and frequently. The present invention observes destination ports and selects packets that come from nodes which are sending to many IP addresses or to many ports at one IP address.

Packets which emanate from a selected source are further analyzed. The selected source is identified by records accumulated on their destination ports and destination IP addresses. In an embodiment, the analysis is embedded within a plug-in installed in the operating system of the gateway or content filter. In another embodiment, the analysis is an application module in the user space of a gateway or of a content filter. The analysis can be at least one of a digital signature, a hash, a checksum, or some other quickly computed value which serves as a fingerprint which triggers disposal.

Packets which are associated with a certain peer-to-peer application can be disposed of according to a policy customized for the network. Certain departments, groups, or individuals may be enabled or disabled for certain peer-to-peer applications. Packets may be dropped, rejected, redirected, or forwarded according to content, source, or destination.

In an embodiment a network apparatus 600 filtering traffic from a first network to a second network comprising at least one network interface 610 communicatively coupled to a processor 630, the processor communicatively coupled to an computer readable instruction store 650, a computer readable data store 670, and to a circuit for matching packets with a peer-to-peer fingerprint 690; the computer readable data store comprising for each source host in the first network a resetable counter of destination hosts, a list of destination hosts, and for each destination host associated with a source, a resetable counter of destination ports and a list of destination ports, and a flag for each source host which can be set when any counter reaches its terminus before being reset. It may be appreciated that the invention may be practiced with only the counters of destination hosts or only the counters of destination ports because they measure independent characteristics of peer-to-peer applications.

In an embodiment a software program product is tangibly encoded on a computer-readable store comprising computer executable instructions to configure a processor to examine packets received from a first network, to determine a source host of potential peer-to-peer traffic, to further analyze all packets received from said source host of potential peer-to-peer traffic, and to discard packets from said source host which match a peer-to-peer fingerprint; wherein to determine a source host of potential peer-to-peer traffic comprises one of to measure the rate per unit time of diverse destination hosts addressed by the source host, and to measure the number of destination ports within each destination host addressed by the source host.

In an embodiment computer implemented method for controlling peer-to-peer network traffic at a gateway comprising:
  receiving and storing at least one peer-to-peer fingerprint pattern 120; selecting a source of peer-to-peer application traffic comprising
    scanning packets transmitted from a source,
    accumulating source and destination IP addresses and destination port number for each of said scanned packets 250, 350,
    counting for each individual destination IP address of scanned packets transmitted by the source the number of destination ports used 270 and
  when the number of destination ports used at any one destination IP address within packets_transmitted to by said source exceeds a maximum number of destination ports per destination IP threshold 272;
    matching each packet transmitted from said selected source 140 with the stored at least one peer to peer fingerprint pattern 180, 280; and
    disposing of any packet which matches according to a peer-to-peer service policy 190.
  In an embodiment the method further comprises computing the number of destination IP address per unit time a source sends to 360;

if the number of destination IP address per unit time a source sends to exceeds a certain threshold rate of maximum destination IP addresses transmitted to per unit time 362, disposing each matching each packet transmitted from said selected source with the stored at least one peer-to-peer fingerprint pattern 380

In an embodiment a computer-implemented method for detecting peer-to-peer application traffic comprises reading a first threshold of maximum number of destination ports per destination IP address, reading a second threshold rate of number of unique destination IP addresses within packets transmitted by a single source per unit time, scanning all packets transmitted from a source;

accumulating source and destination IP addresses and destination port number for each packet sent by each source 450;

computing the number of unique destination IP addresses per unit time the source sends to 460; and when at least one of the following condition is true:

the number of destination ports per unique destination IP address 470 exceeds said first threshold 472, and the number of unique destination IP addresses per unit time the source send to exceeds said second threshold 462, disposing each packet transmitted by said source which matches with a peer-to-peer fingerprint pattern 480

In an embodiment the method further comprises the step of passing packets sent to standard ports associated with documented client server applications without further examination of destination IP addresses 510.

In an embodiment the computer implemented method for peer-to-peer fingerprint pattern matching is tangibly embodied as an executable module adapted to control a processor at the kernel level of access returning a match or no-match with a certain peer-to-peer application.

In an embodiment the computer implemented method for peer-to-peer fingerprint pattern matching is tangibly embodied as an executable module adapted to control a processor at the user level of access returning a match or no-match with a certain peer-to-peer application.

In an embodiment, a computer-implemented process for selecting a source of potential peer-to-peer application traffic for further analysis comprises scanning a plurality of packets transmitted by a source within a first network to at least one destination within a second network;

accumulating source and destination IP addresses and destination port number for each of said scanned packets 250;

counting the number of destination ports recorded for each destination IP address recorded 270; and when the number of destination ports per destination IP address in packets transmitted by said source exceeds a stored maximum ports per destination IP address threshold number 272, storing the source of the scanned packets in a computer-readable list of potential peer-to-peer application sources.

In an embodiment the method further comprises disposing a packet transmitted by a source on a list of potential peer-to-peer application sources when said packet matches a peer-to-peer fingerprint pattern 280.

In an embodiment a computer-implemented process for selecting a source of potential peer-to-peer application traffic for further analysis comprises:

scanning a plurality of packets transmitted by a source within a first network;

accumulating source and destination IP addresses for each of said scanned packets 350;

computing the number of destination IP addresses which the source transmits packets to per unit time 360; and when the number of destination IP addresses in packets transmitted per unit time by said source exceeds a stored maximum number of destination IP addresses per unit time threshold number 362, storing the source of the scanned packets in a computer-readable list of potential peer-to-peer application sources.

In an embodiment the process further comprises the step for each source on a list of potential peer-to-peer application sources, disposing of every packet transmitted by said source which matches with a peer-to-peer fingerprint pattern 380.

The present invention is a method 100 in FIG. 1 comprising the steps of receiving and storing at least one peer-to-peer fingerprint pattern 120;

receiving a list of selected sources 130;

receiving a packet from a selected source 140;

matching a packet with a peer-to-peer fingerprint pattern 180; and disposing of the packet according to a peer-to-peer service policy 190.

Figure 2:
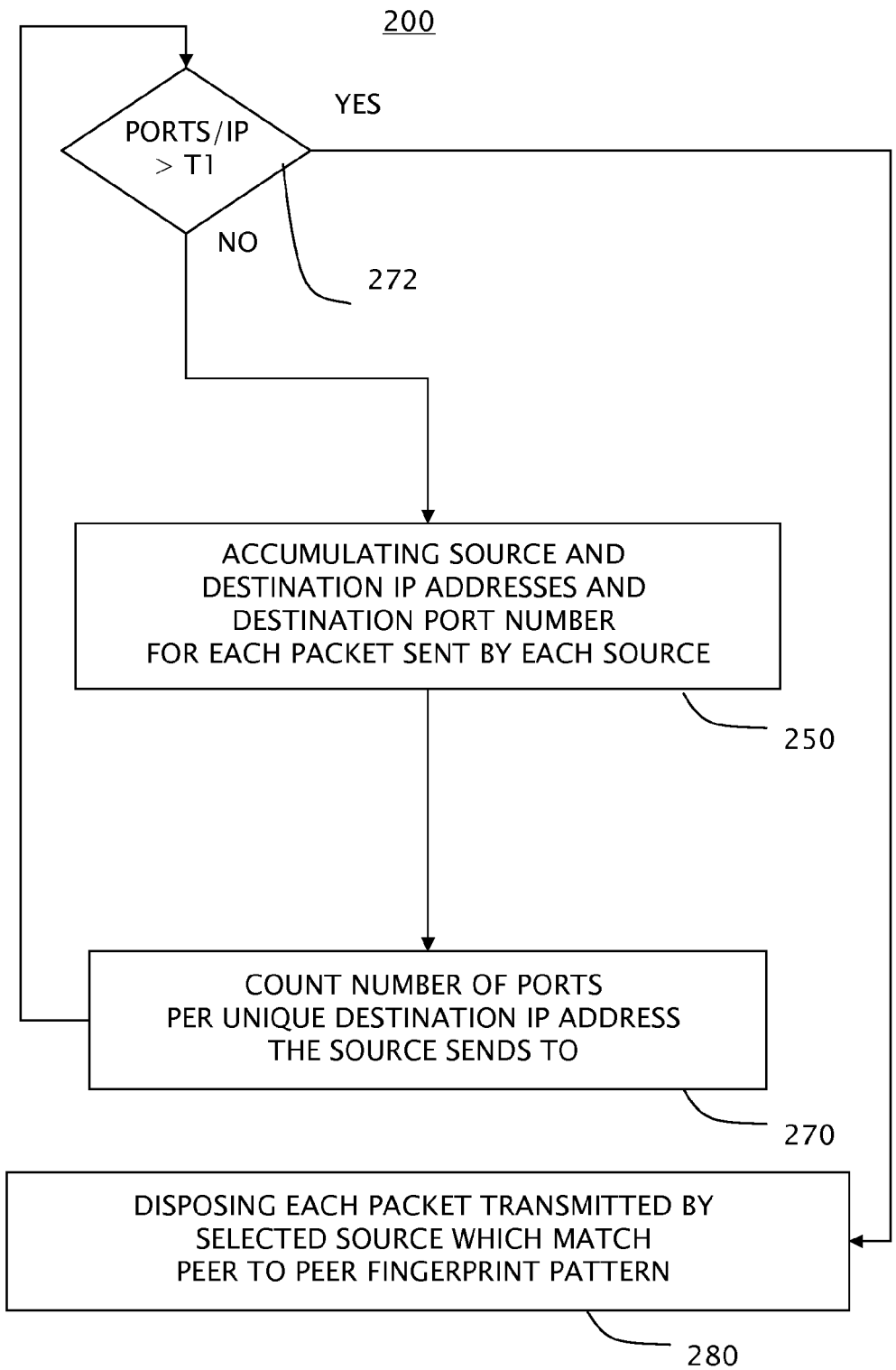
FIG. 2 is a flowchart illustrating further steps for optimization.

To optimize the performance of the present invention, the method further comprises a preliminary process 200 in FIG. 2 for selecting a source of peer-to-peer application traffic comprising scanning a plurality of packets transmitted by a source within a first network to at least one destination within a second network;

accumulating source and destination IP addresses and destination port number for each of said scanned packets 250;

counting the number of destination ports recorded for each destination IP address recorded 270; and when the number of destination ports per destination IP address in packets transmitted by said source exceeds a stored maximum ports per destination IP address threshold number 272, storing the source of the scanned packets in a computer-readable list of potential peer-to-peer application sources.

In an embodiment the method further comprises disposing a packet transmitted by a source on a list of potential peer-to-peer application sources when said packet matches a peer-to-peer fingerprint pattern 280.

Figure 3:
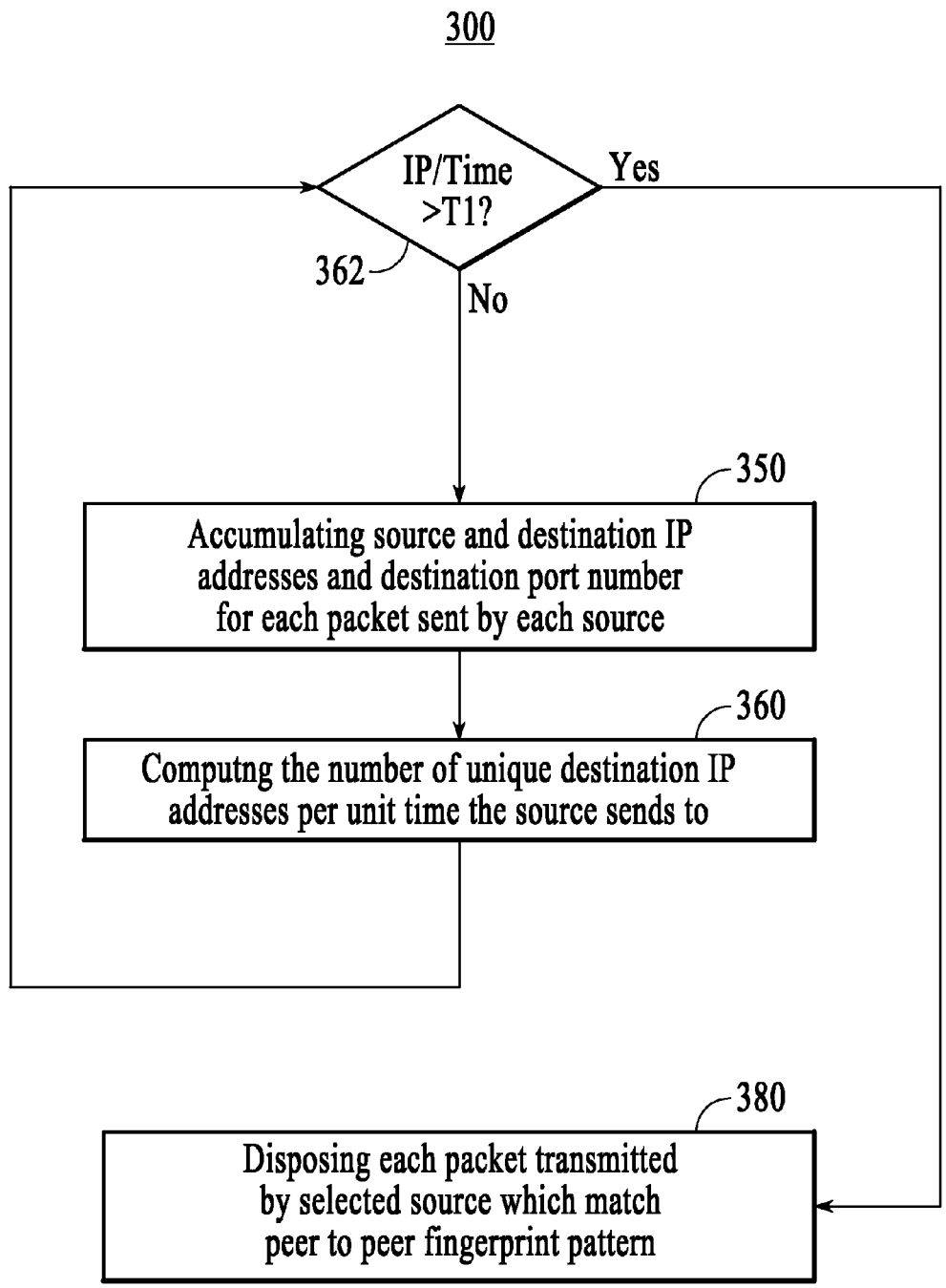
FIG. 3 is a flowchart illustrating alternate steps for optimization.

Another optimization method 300 in FIG. 3 for reducing the effort of selecting a source of peer-to-peer application traffic comprises the steps of: scanning a plurality of packets transmitted by a source within a first network;

accumulating source and destination IP addresses for each of said scanned packets 350;

computing the number of destination IP addresses which the source transmits packets to per unit time 360; and when the number of destination IP addresses in packets transmitted per unit time by said source exceeds a stored maximum number of destination IP addresses per unit time threshold number 362, storing the source of the scanned packets in a computer-readable list of potential peer-to-peer application sources.

In an embodiment the process further comprises the step for each source on a list of potential peer-to-peer application sources,
 disposing of every packet transmitted by said source which matches with a peer-to-peer fingerprint pattern 380.

Figure 4:
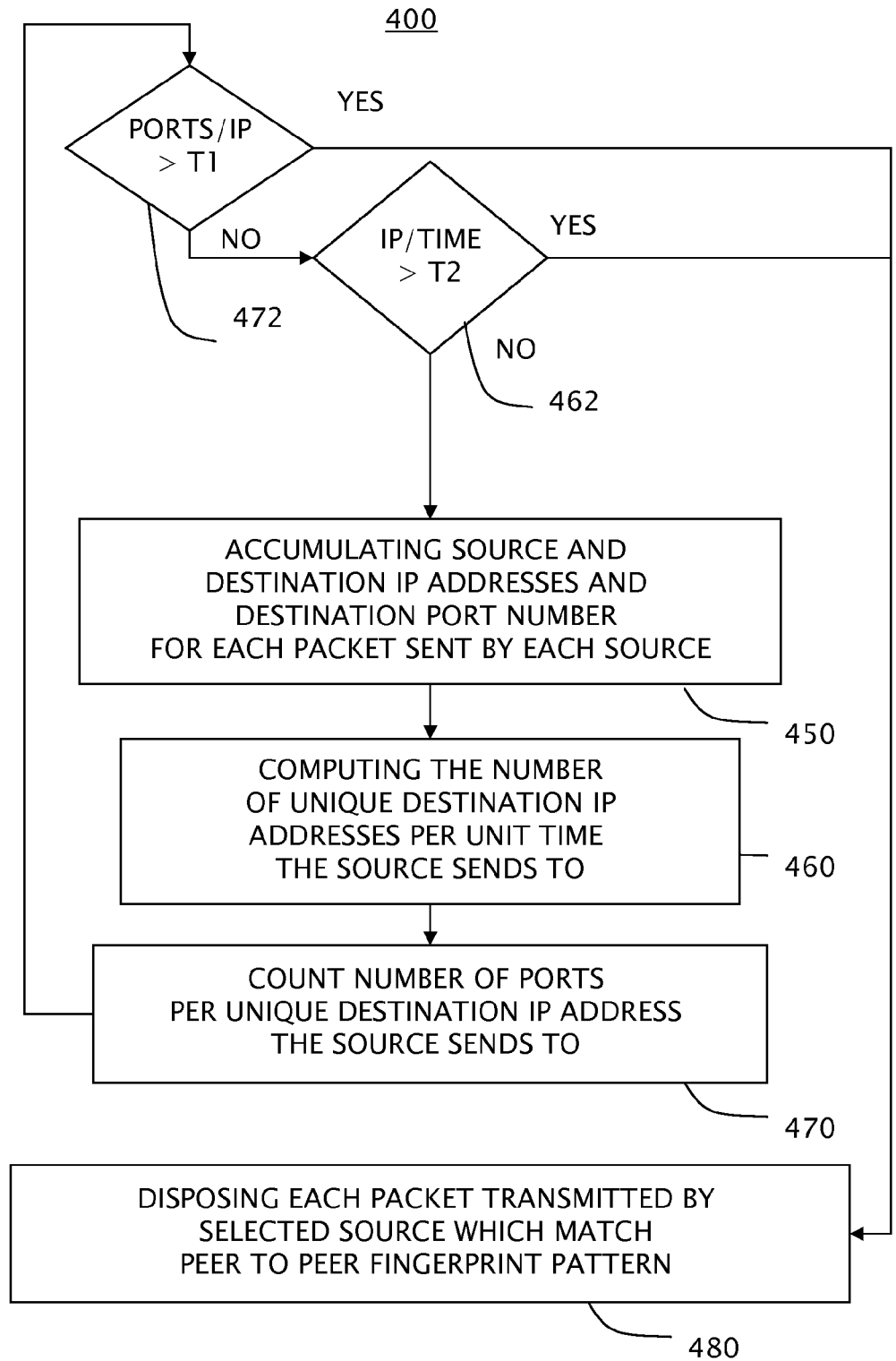
FIG. 4 is a flowchart illustrating combined optimization steps.

The best mode at the time of this application is to combine both of the above as follows 400 in FIG. 4;
comprising
 reading a first threshold of maximum number of destination ports per destination IP address,
 reading a second threshold rate of number of unique destination IP addresses within packets transmitted by a single source per unit time,
 scanning all packets transmitted from a source;
 accumulating source and destination IP addresses and destination port number for each packet sent by each source 450;
 computing the number of unique destination IP addresses per unit time the source sends to 460; and
when at least one of the following condition is true:
the number of destination ports per unique destination IP address 470 exceeds said first threshold 472,
and
the number of unique destination IP addresses per unit time the source send to exceeds said second threshold 462, disposing each packet transmitted by said source
 which matches with a peer-to-peer fingerprint pattern 480.

Figure 5:
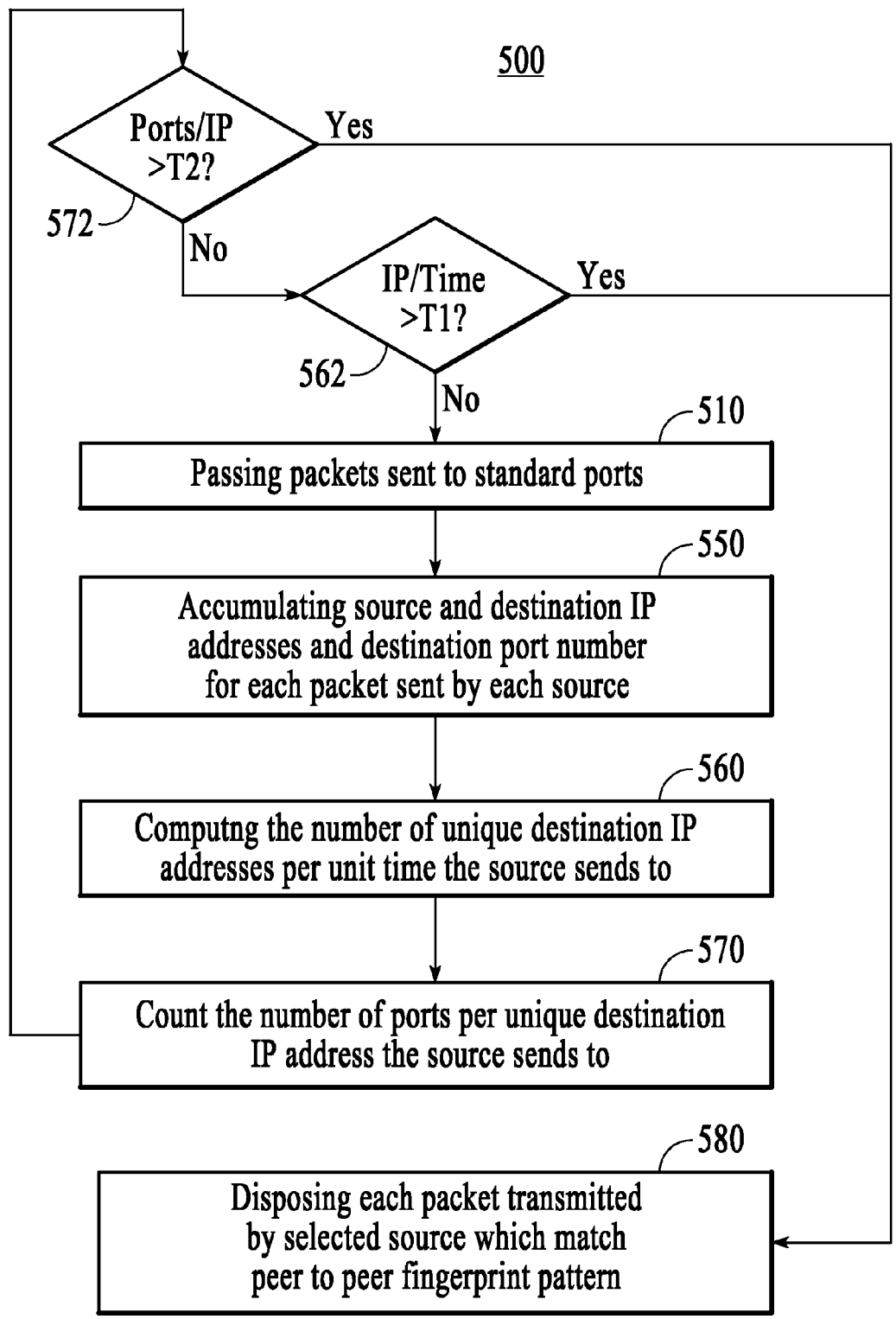
FIG. 5 is a flowchart illustrating the best mode of optimization.
Figure 6:
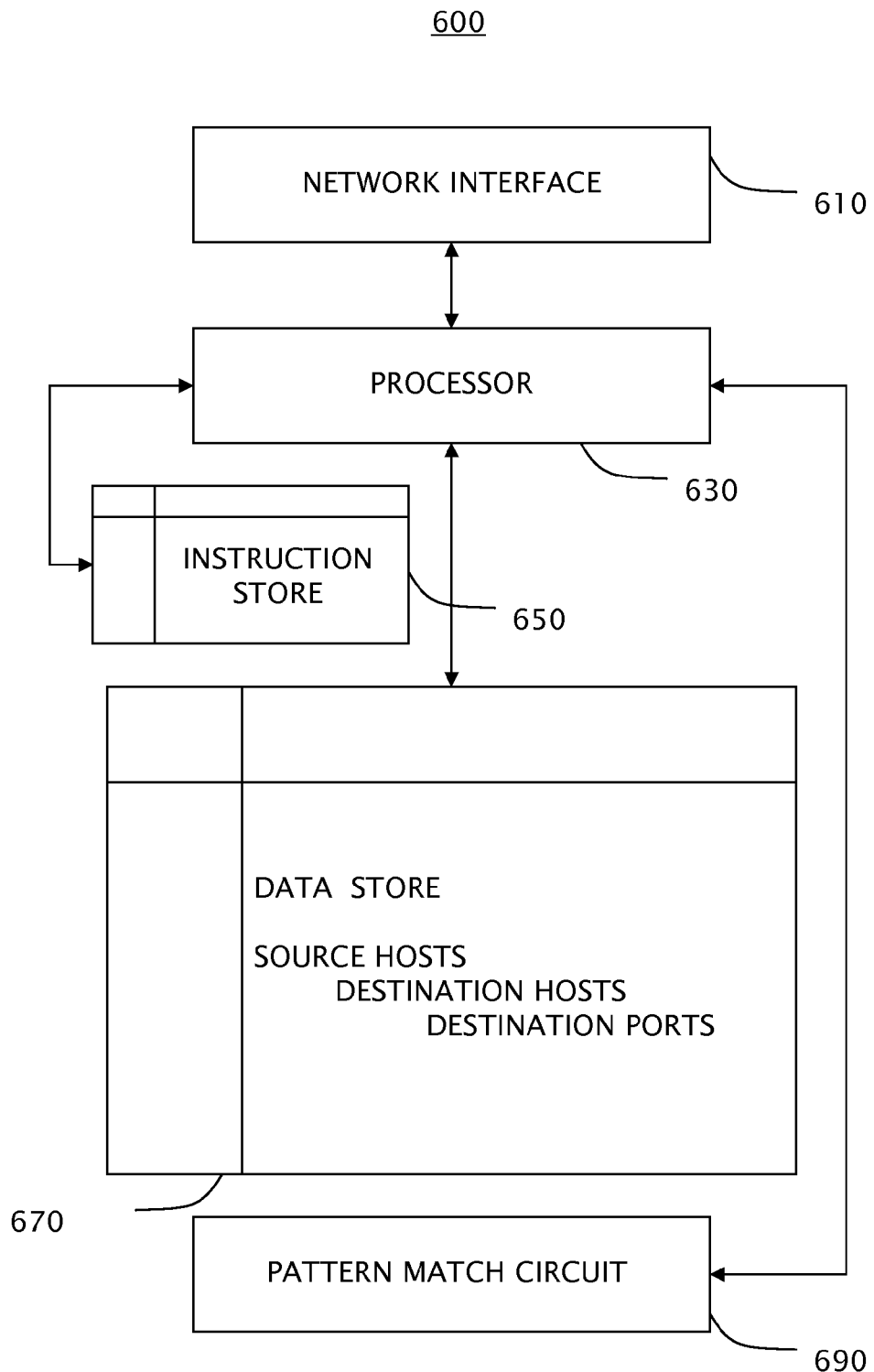
FIG. 6 is a block diagram of an apparatus embodiment of the invention

A further optimization is adding the step of passing packets sent to standard ports associated with documented client server applications without further examination of destination IP addresses 510 in FIG. 5. This escapes the accumulation and analysis and pattern match.

In an embodiment a peer-to-peer fingerprint pattern is tangibly embodied as an executable module adapted to control a processor at the kernel level of access returning a match or no-match with a certain peer-to-peer application.

The present invention is a system for controlling peer-to-peer traffic comprised of
 a gateway attaching a first network to a second network or a cache server in a first network relaying packets to a second network;
 means for reading port and IP addresses on a packet traversing the gateway;
 means for receiving peer-to-peer fingerprint patterns;
 means for disposing of packets; and
 means for matching peer-to-peer fingerprint patterns.

Server client applications such as email, use stable ports on widely recognized IP addresses. These are frequently documented in the RFC used in the Internet community. Peer-to-peer applications seek to avoid being blocked by conventional firewalls by randomly picking unused ports. By their nature some peer-to-peer applications attach many destinations to a source and many sources to a destination.

The method for disposing of peer-to-peer packet traffic can be selected from any of the following: dropping the packet, rejecting the packet, redirecting the packet, recording the packet, or forwarding the packet. The disposition of packets may vary according to the specific peer-to-peer application or may be allowed for certain nodes and denied to other nodes. The invention further comprises reading a local policy which allows specific peer-to-peer applications for certain sources.

To simplify installation and configuration of the invention, it can be provided as an appliance, an integrated turnkey hardware product having plug and play characteristics. In one embodiment the invention is a content analysis apparatus to which packets are directed by a router. In another embodiment the invention is a gateway which observes outbound packets originating from source nodes within the local area network and destined for nodes outside of the local area network. In an embodiment the invention is provided as a remote service such as referred to as cloud computing. Means comprise conventional processors and circuits communicatively coupled to instruction stores and signal receiving and sending circuits and data stores as is known. A illustrative block diagram provides one embodiment of means for realizing the claimed invention.

Conclusion

The present invention is distinguished from conventional firewalls which rely on a static blacklist of ports or ip addresses which represent nodes known to host objectionable content. It is the nature of some peer-to-peer applications to have pseudo-randomly selected ports which will seldom be repeated. The present invention is distinguished by its method for identifying potential sources of peer-to-peer traffic. The present invention is distinguished by its steps of receiving a digital fingerprint and matching selected outgoing packets rather than all outgoing packets with the digital fingerprint which characterizes a peer-to-peer application.

This invention addresses a problem facing network administrators who are responsible for content distributed from their resources to the Internet. Furthermore they must manage their enterprise resources to achieve high quality of service for their own internal customers. With a limited budget for network access bandwidth to the Internet, uncontrolled peer-to-peer applications could result in network congestion much earlier than expected or budgeted. Further, peer-to-peer applications may be configured to reveal personal or confidential information stored on the application host without the intent or the authority of the user to do so.

By installing a peer-to-peer application gateway or cache attaching a first network to a second network, an administrator obtains a processor adapted to reading port and IP addresses on a packet traversing the gateway; receiving updates to a plurality of peer-to-peer fingerprint patterns; analyzing a packet for a peer-to-peer fingerprint pattern; disposing of packets; and heuristically identifying suspect traffic for deeper analysis. In an embodiment a connection to a service operating in the cloud performs the same steps for a network. The processor is adapted by a program product tangibly embodied as executable instructions recorded on computer readable media in a store which may be automatically updated to recognize digital signatures associated with peer-to-peer content. The processor is adapted to read destination ports of packets and compare them with standard client server application ports. The processor is adapted to record destination IP addresses and identify packets sent by nodes to destination IP addresses and destination ports with a behavior characteristic of peer-to-peer applications. In contrast to conventional firewalls, the processor is adapted to record and measure the range and volume of non-standard client server application ports on any one destination host in packets transmitted by a source host whereby a source host is added to the list of source hosts suspected of generating peer-to-peer traffic.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software.

Other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, or transport the computer program for use by or in connection with the instruction execution system apparatus, system or device. The computer readable medium can be, by way of example only but not by limitation, an chemical, electronic, magnetic, optical, electromagnetic, infrared, or semiconductor system, apparatus, system, device, material, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The scope of the invention includes all modification, design variations, combinations, and equivalents that would be apparent to persons skilled in the art, and the preceding description of the invention and its preferred embodiments is not to be construed as exclusive of such.

I claim:

1. A network apparatus comprising a first network interface circuit coupled to a first network and a second network interface circuit coupled to a second network;
   a computer readable data store for each source host in the first network, each store comprising
   a resetable counter of destination hosts, a list of destination hosts in the second network, and for each destination host
   a resetable counter of destination ports and a list of destination ports, and a flag for each source host which can be set when either counter reaches its terminus before being reset; and
   a processor and memory.

2. A method for operation of a network apparatus comprising a processor and memory for control of peer-to-peer network traffic at a gateway between a first network and a second network, the method comprising:
   receiving and storing at least one peer-to-peer fingerprint pattern;
   selecting a source of peer-to-peer application traffic comprising scanning packets transmitted from a source,
   accumulating source and destination IP addresses and destination port number for each of said scanned packets,
   counting for each individual destination IP address of scanned packets transmitted by the source the number of destination ports used; and when the number of destination ports used at any one destination IP address within packets transmitted to by said source exceeds a maximum number of destination ports per destination IP threshold,
   matching each packet transmitted from said selected source with the stored at least one peer to peer fingerprint pattern; and
   disposing of any packet which matches according to a peer-to-peer service policy.

3. The method of claim 2 further comprising
   determining a number of destination IP address per unit time a source sends to; if the number of destination IP address per unit time a source sends to exceeds a certain threshold rate of maximum destination IP addresses transmitted to per unit time,
   matching each packet transmitted from said selected source with the stored at least one peer-to-peer fingerprint pattern.

4. A method of operation for a network apparatus coupled to a first network and to a second network to detect and block peer-to-peer application traffic by identification of a source host as a possible source host of peer-to-peer application traffic, the method comprising:
   reading a first threshold of maximum number of destination ports per destination IP address,
   reading a second threshold rate of number of unique destination IP addresses within packets transmitted by a single source per unit time,
   scanning all packets transmitted from the source host;
   accumulating source and destination IP addresses and destination port number for each packet sent by each source host;
   computing a number of unique destination IP addresses per unit time the source host sends to; and when at least one of the following condition is true: a number of destination ports per unique_destination IP address exceeds said first threshold, and a number of unique destination IP addresses per unit time the source host sends to exceeds said second threshold, disposing each packet transmitted by said source host which matches with a peer-to-peer fingerprint pattern.

5. The method of claim 4 further comprising
   passing packets sent to standard ports associated with documented client server applications without further examination of destination IP addresses.

6. The method of claim 5 wherein the computer implemented method for peer-to-peer fingerprint pattern matching is tangibly embodied as an executable module encoded within non-transitory computer-readable media which controls a processor at the kernel level of access returning a match or no-match with a certain peer-to-peer application.

7. The method of claim 5 wherein the computer implemented method for peer-to-peer fingerprint pattern matching is tangibly embodied as an executable module encoded within non-transitory computer-readable media which controls a processor at the user level of access returning a match or no-match with a certain peer-to-peer application.

8. A process operable within a network attached apparatus which beneficially identifies at least one source of potential peer-to-peer application traffic for further analysis comprising
   scanning a plurality of packets received from a source within a first network;
   accumulating source and destination IP addresses and destination port number for each of said scanned packets;
   incrementing a counter for each unique destination port recorded for each destination IP address recorded; and when the counter exceeds a stored maximum ports per destination IP address threshold number,
   storing the source of the scanned packets in a computer-readable list of potential peer-to-peer application sources.

9. The process of claim 8 further comprising
   disposing a packet received from a source on a list of potential peer-to-peer application sources when said packet matches a peer-to-peer fingerprint pattern.

10. A method of operation for a network attached processor and memory to select a source of potential peer-to-peer application traffic for further analysis comprising
    scanning a plurality of packets transmitted by a source within a first network;
    accumulating source and destination IP addresses in computer-readable non-transitory storage for each of said scanned packets;
    determining a number of destination IP addresses which the source transmits packets to per unit time; and when the number of destination IP addresses in packets transmitted per unit time by said source exceeds a stored maximum number of destination IP addresses per unit time threshold number,
    storing the source of the scanned packets in a computer-readable non-transitory store as a list of potential peer-to-peer application sources.

11. The method of claim 10 further comprising for each source on a list of potential peer-to-peer application sources stored in the computer-readable non-transitory store, disposing of every packet transmitted by said source which matches with a peer-to-peer fingerprint pattern.

* * * * *